United States Patent [19]

Nedele et al.

[11] Patent Number: 5,361,644
[45] Date of Patent: Nov. 8, 1994

[54] COMBINATION CONTROL GRIP FOR TWO-HAND OPERATION OR GUIDED-SURFACE INDUSTRIAL TRUCKS

[75] Inventors: Helmut Nedele, Metzingen; Hartwig Schnabel, Stuttgart, both of Germany

[73] Assignee: Wagner Fordertechnik GmbH & Co. KG, Reutlingen, Germany

[21] Appl. No.: 57,325

[22] Filed: May 5, 1993

Related U.S. Application Data

[63] Continuation-in-part of Ser. No. 866,196, Apr. 9, 1992, abandoned.

[30] Foreign Application Priority Data

Apr. 10, 1991 [DE] Germany .............. 4111675
May 12, 1992 [DE] Germany .............. 4215547

[51] Int. Cl.$^5$ .............................. G05G 9/04
[52] U.S. Cl. ........................ 74/491; 74/523; 180/19.3; 180/315; 192/131 R
[58] Field of Search ............. 74/491, 523; 192/131 R; 180/19.3, 315

[56] References Cited

U.S. PATENT DOCUMENTS

| | | | |
|---|---|---|---|
| 3,491,867 | 1/1970 | Alexander | 192/131 R |
| 3,937,294 | 2/1976 | Haddock | 74/533 X |
| 4,555,960 | 12/1985 | King | 74/491 X |
| 4,645,030 | 2/1987 | Von Bernuth et al. | 74/523 X |
| 4,726,248 | 2/1988 | Kawai et al. | 74/523 X |

FOREIGN PATENT DOCUMENTS

| | | |
|---|---|---|
| 1246429 | 8/1967 | Germany . |
| 1905428 | 2/1969 | Germany . |
| 2402057 | 1/1974 | Germany . |
| 7822523 | 12/1978 | Germany . |
| 3039584 | 4/1982 | Germany ........... 180/315 |
| 0175061 | 3/1986 | Germany . |
| 0232073 | 8/1987 | Germany . |
| 3840800 | 12/1988 | Germany . |
| 3925872 | 8/1989 | Germany . |

*Primary Examiner*—Allan D. Herrmann
*Attorney, Agent, or Firm*—McGlew and Tuttle

[57] ABSTRACT

A control panel (24) of an industrial truck is provided, on two sides, with combination control grips (2a, 2b), which can both be rotated in the circumferential direction and deflected vertically, and on which control levers (45a, 45b) are arranged. Signal transmitters (51, 52), which can be operated by the fingers, and by means of which various types of movements of an internal load pickup means of the truck can be selected and can be preset as a set value for the control lever (45) of the respective opposite combination control grip (2), are integrated within the control levers (45a, 45b). By rotating the combination control grips (2a, 2b) by means of the control levers (45a, 45b) in the circumferential direction, proportional speed signals are generated for the selected movements of the load pickup means, while the vertical deflecting movement of the combination control grips is used primarily for the forced acknowledgment of two-hand control commands in order to rule out the possibility that the operator of the truck would reach out of the lateral contour of the truck in the aisle. The rotary and swinging deflecting movements are measured to form control signals. All signal-generating elements are mutually connected, in principle, such that their simultaneous, bilateral operation is required for moving the industrial truck and/or for steering the load-pickup device.

18 Claims, 5 Drawing Sheets

COMBINATION CONTROL GRIP FOR TWO-HAND OPERATION OR GUIDED-SURFACE INDUSTRIAL TRUCKS

This is a continuation-in-part application of U.S. patent application Ser. No. 07/866,196 filed Apr. 9, 1992 now abandoned.

FIELD OF THE INVENTION

The present invention pertains to a combination control grip for two-hand operation of guided-surface industrial trucks, especially aisle forklifts, with two separate signal-generating means for the simultaneous generation of two control signals, wherein the combination control grip is rotationally coupled to the freely hanging end of a two-hinge rotary switch, which is rigidly attached to the housing on another side of the switch, and which is rotatable around a first and/or second hinge and is spring-tensioned against torsion, and first signal-generating means detecting rotations are provided for acknowledging the two-hand control signal, and second signal-generating means for generating at least one truck control signal are provided.

BACKGROUND OF THE INVENTION

Prior-art control elements for industrial trucks are usually divided into several parts depending on their function. As soon as more than one truck function must be controlled with such control elements, both hands of the operator are required. This makes simultaneous steering of the truck impossible, so that the truck must, in principle, be stopped to operate its functions.

Control elements in which a truck function, e.g., a drive command, is actuated continuously via a grip, and another function of the truck, e.g., the lifting and lowering of the load platform, is induced by actuating pressure switches or rocker-type switches, which are within a close range of and outside the control grip, are already known. This makes it difficult for the operator to operate either the control grip or the pressure switch or rocker-type switch, because the latter often may be outside the action zone of the thumb, for which they are mostly intended, and thus cannot be operated simultaneously when the control grip has been turned. This makes it impossible to superimpose these truck functions or simultaneous movement processes that would result. Aside from this, such devices usually require separate control circuits, whose number matches that of the individual switches. Control elements in which pressure switches or pushbuttons are already arranged directly on the control grip, e.g., on its front side, rule out continuous function control.

This is also true of the pilot control device disclosed in German Utility Patent No. DE-GM 78,22,523, which consists of a T-shaped adjusting lever and a plurality of pushbuttons or selector levers arranged on it, whose operation is cumbersome and which do not rule out operating errors.

In guided-surface industrial trucks, especially railborne aisle forklifts, the accident prevention regulations specify that both hands of the operator must be bound to signal transmitters during travel in the aisle between the shelves, so that they cannot be extended beyond the outer contours of the truck into the aisle between the shelves. Circuitry (which stops operation) is known in the art wherein the circuitry forces the operator to keep both hands on the control grips. This has been established by national requirements and has been incorporated into standards such as *SAFETY STANDARD FOR LOW LIFT AND HIGH LIFT TRUCKS* established by The American Society of Mechanical Engineers (ASME/ANSI b56.1-1988). Use of the standard along with an understanding of the circuitry needed for two hand acknowledgement is known in the art, for example from U.S. Pat. Nos. 4,645,030 and 3,491,867 which are hereby incorporated by reference.

Such a two handed acknowledgement standard leads to the difficulty that due to the forced acknowledgment of the two-hand operation, only one hand is available for issuing actual control commands for horizontal or vertical movement of the truck. As a consequence, the operator performs, for example, the forced acknowledgment for two-hand control with his left hand, while the horizontal travel movements of the industrial truck are performed with the right hand. To initiate the vertical lifting movements, the operator is forced to reach over, at least with the steering hand, to a second, separate control element or a corresponding signal transmitter, which is usually located on the other side of the control panel, which will then obviously require both hands to reach for the other grips, because forced acknowledgment must than be given with the other hand. Play time-optimizing diagonal travels or movements are ruled out with such devices.

In a control element for industrial trucks, which is known from German Offenlegungsschrift No. DE-OS 39,25,872, a multifunction control grip for the continuous actuation of a controller diagram is additionally equipped on its circumference with a separate signal transmitter for the continuous and/or finely stepped actuation of a lifting controller, so that travel control and/or lifting control can be performed simultaneously or in a superimposed manner. Even though this control element offers great advantage for freely traveling industrial trucks, it is unsuitable for guided-surface aisle forklifts because of the lack of forced acknowledgment for two-hand operation.

SUMMARY AND OBJECTS OF THE INVENTION

It is a primary object of the present invention to provide—with simple means and at a low cost—a reliably operating and especially ergonomic combination control grip for guided-surface industrial trucks, especially aisle forklifts, with which operating errors, such as driving errors or incorrect load pickup, can be reliably ruled out even under very difficult conditions of use, and which permits simultaneous issuance of a maximum number of control commands for both the drive unit and at least one load manipulation unit, despite the forced acknowledgment of the two-hand command specified by the accident prevention regulations, without the need to ever remove the hand or hands from the combination control grip.

To attain this object, it is suggested according to the present invention that, depending on the needed number, type and degrees of freedom of internal load pickup means of the truck, at least one additional signal transmitter, which can be operated by the fingers, be able to be arranged in the combination control grip for generating at least one additional control signal. The integration of additional signal transmitters in the combination control grip makes it possible to issue control commands for complex load pickup means with a plurality of degrees of freedom, as well as the simultaneous issuance of control commands for a plurality of load pickup means with a limited number of degrees of freedom, without the hands reaching over to different signal transmitters, which is bothersome and time-consuming, with simultaneous compliance with the accident prevention regulations and the exclusion of any risk for the operator. As a result, the operator can concentrate more intensely on the loading and unloading operations, as a consequence of which the physical and psychological load is minimized, and his performance capacity can ba maintained over a long period of time even while performing complex loading and unloading operations, which leads to a more efficient work result.

This object is attained according to the present invention in a combination control grip of the class described in the introduction by rotationally coupling the combination control grip with the freely hanging end of a two-hinge rotary switch, whose other end is rigidly attached to the housing and which is rotatable around a first and/or second hinge, is pretensioned against torsion in a spring-loaded manner, and by providing first signal-generating means detecting torsions for the forced acknowledgment of the two-hand control signal, as well as second signal-generating means for generating at least one truck control signal. The integration of the signal transmitter for forced acknowledgment, which was previously a separate unit, with the second hand directly in the combination control grip in addition to a signal-generating means present in this for issuing a truck control command makes it possible—by safe and time-saving operation without the hands reaching over to different signal transmitters, which is bothersome and time-consuming—to achieve play time optimization of the industrial truck along with compliance with the accident prevention regulations and the exclusion of any risk for the operator, who can concentrate more intensely on the loading and unloading operations as a result.

In a variant of the inventive idea, two combination control grips are simultaneously arranged on a control panel, preferably on the two sides of it, and one combination control grip is designed to generate a travel control signal and the other to generate a lifting control signal, and each combination control grip is provided simultaneously as a mutual (reciprocal) forced acknowledgment member for the other. Besides person protection, this arrangement ensures particularly economical use of the industrial truck as a consequence of the possibility of performing horizontal and vertical movements in a chronologically superimposed manner.

To prevent wear-related malfunctions and breakdowns, at least one digital, signal-sending signal-generating means of contactless design, preferably a Hall generator operating according to the magnetostrictive principle, is provided at the two-hinge rotary switch in a preferred embodiment of the present invention.

Another preferred embodiment of the present invention is characterized in that a coupling member of the two-hinge rotary switch is mounted in the hinges of two articulated shoes, of which a rear articulated shoe is rigidly attached to the housing, and opposite and mutually spring-tensioned spring bolts for automatically resetting the two-hinge rotary switch after its torsion are arranged in terminal ball sockets of the coupling member and of the articulated shoes. This mechanically simple design is characterized by low manufacturing costs, high functionality, and low maintenance requirement.

It proved to be particularly advantageous to attach a sheet bar to the coupling member, to arrange the first signal-generating means for acknowledgment of the two-hand control signal at the rear hinge shoe and at the sheet bar, such that these signal-generating means are located opposite each other, and to arrange the second signal-generating means for inducing a truck control signal (travel control or lifting control) opposing each other at the front articulated shoe and the sheet bar, wherein the combination control grip is fastened on the side of the front articulated shoe facing away from the sheet bar. This clear structural boundary between mechanics, all the electrical components necessary for signal processing and generation, e.g., evaluating circuits, can be arranged in printed form, ICs or microchips on the sheet bar and can be easily checked or replaced in the case of a malfunction.

According to a preferred variant of the present invention, the coupling member with the sheet bar and a first component can be moved by a vertical deflecting movement of the control grip around an axis of rotation relative to the rear, stationary articulated shoe with the second component of the first signal-generating means, and the second, freely hanging articulated shoe with a first component can be moved by rotating the combination control grip around an axis of rotation relative to the sheet bar with the second component of the second signal-generating means, which is advantageous for simple and absolutely fault-free handling of the combination control grip.

Further advantageous embodiments of the present invention are described in the claims as well as the specification that follows.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
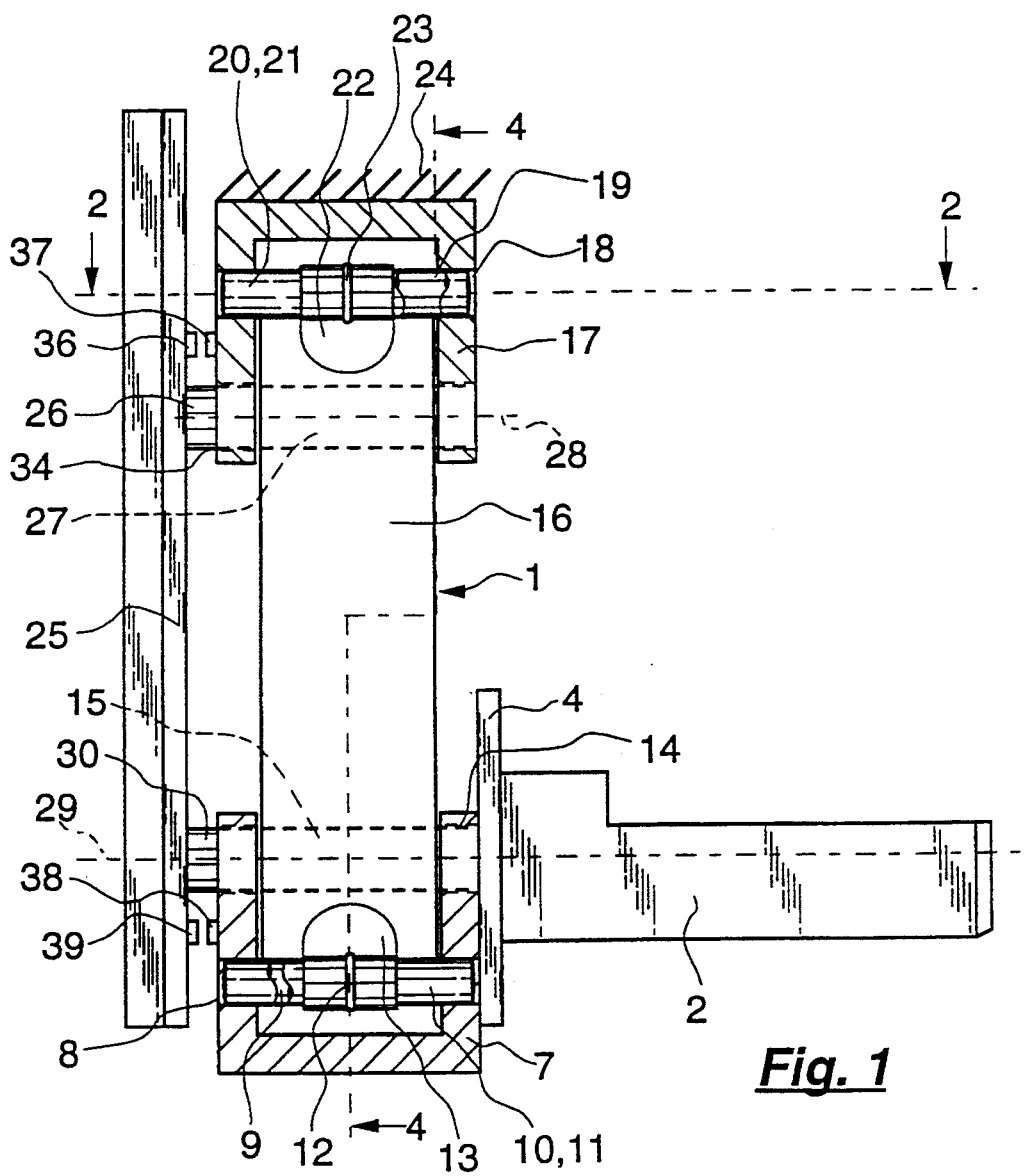
FIG. 1 is a top view of a combination control grip according to the present invention.

Referring to the drawings and in particular to FIG. 1, a double-jointed turn switch or double-jointed rotary switch generally designated 1 (e.g. the switch contains two joints, each of the joints on one end and each being turnable by means of a combination control grip member 2) is provided which double-joint action allows commands for horizontal and/or vertical movement and additionally forced acknowledgement (for accident prevention).

As is shown in FIG. 1, a stationary, U-shaped articulated shoe 17—hereinafter called the rear articulated shoe 17—is fastened on its front side, which is rigidly attached to the housing, to the control panel 24 (indicated symbolically) of an industrial truck, preferably a guided-surface aisle forklift. According to FIGS. 3 and 4, the articulated shoe 17 has laterally a trapezoidal cross section and is provided with passage holes (through holes) 34 in the middle of its two side plates. A continuous first hinge pin 27, hereinafter called first hinge pin 27, to which an elongated coupling member 16 is attached, is movably arranged in the passage holes 34. The coupling member 16 is provided at the end of the underside and top side with continuous, arc-shaped hinge sockets 19, as is apparent from FIGS. 1 and 3. Likewise arc-shaped recesses (relief) 18 are provided, axially aligned with the hinge sockets 19 of the coupling member 16, in both side plates of the articulated shoe 17. Mutually opposite spring bolts 20, 21, which are mutually spring-tensioned by means of a draw spring (tension spring) 23 in a recess 22 of the coupling member 16 and elastically connect the coupling member 16 to the articulated shoe 17, are inserted in the recesses 18 as well as in the hinge sockets 19.

As was described above, the other, freely hanging end of the coupling member 16 is mounted in the same manner in a second articulated shoe 7, with through holes 14, which second articulated shoe 7 acts around a hinge 15—hereinafter called first hinge pin 15—and is likewise spring-tensioned relative to the articulated shoe 16 by means of two spring bolts 10, 11 arranged in arc-shaped recesses 8 and hinge sockets 9, as well as by a draw spring (tension spring) 12 recessed in a terminal recess 13 of the coupling member 16. The front articulated shoe 7 has rectangular cross section, which passes over at the end into two projections 42. A combination control grip member 2, which is provided with a flattened area 3 for better handling (FIGS. 3 and 4), is screwed onto the projections 42 by means of a flange 4 with two fastening screws 5 and 6.

The two hinge pins 15 and 27 extend, on the side facing away from the combination control grip member 2, beyond the side plates of the articulated shoes 7 and 17, and serve as supports 30 and 26 for a sheet bar (electronic board or plate) 25, which is preferably attached by screwing.

Facing the two articulated shoes 17 and 7, first components 36 and 39 of first and second signal-generating means 36 and 37 as well as 38 and 39 are attached at both ends of the sheet bar 25. The first component of the first signal-generating means (preferably a hall-generator) 36 and second component of the second signal-generating means (preferably a hall-generator) 39 are opposed by second component of the first signal generating means (preferably a permanent magnet) 37 and first component of the second signal-generating means (preferably a permanent magnet) 38 of the first component of the first signal-generating means (preferably a haH-generator) 36 and 37 as well as 38 and 39, which are arranged at the side plates of the two articulated shoes 17 and 7 facing the sheet bar 25. The first component of the first signal-generating means (preferably a hall-generator) 36 through the second component of the second signal-generating means (preferably a hall-generator) 39 may be of contacting design (potentiometer) or contactless design; they preferably operate without contacts and resulting wear.

In the embodiment according to FIGS. 1–4, the second component of the first signal generating means (preferably a permanent magnet) 37 of the first component of the first signal-generating means (preferably a hall-generator) 36 and 37 located at the stationary, rear articulated shoe 17 is designed as a permanent magnet, while a Hall generator is used at the corresponding first component of the first signal-generating means (preferably a hall-generator) 36 at the sheet bar 25. The situation is the same in the area of the front articulated shoe 7: The second component of the second signal-generating means (preferably a hall-generator) 39 attached to the sheet bar 25 is a Hall generator there, while the first component of the second signal-generating means (preferably a permanent magnet) 38 is designed as a permanent magnet. Only the two-hand control signal is acknowledged with the first signal-generating means 36 and 37, while the second signal-generating means 38 and 39 are used exclusively to generate truck control signals, e.g., travel control or lifting control signals, and the association may also be reversed if desired.

As an alternative, the first component of the first signal-generating means (preferably a hall-generator) 36 through the second component of the second signal-generating means (preferably a hall-generator) 39 may be of photoelectric design, preferably forked photocells generating digital control signals. The light emitters and light receivers are each arranged on the sheet bar 25, and the corresponding incremental transducers, preferably line disks, are arranged at the two articulated shoes 7 and 17.

Depending on their intended use and field of application, industrial trucks have been known to be able to be equipped with one or more load pickup means. For various intended uses, it is sufficient for the load pickup means to be provided with one degree of freedom, e.g., for changing height position. Other uses, e.g., the use as a commissioning truck, require a plurality of load pickup means, on the one hand, and more complex load pickup means, on the other hand, with each of them having a plurality of degrees of freedom, e.g., in the x, y and z directions for vertical longitudinal and lateral movements, and possibly also for pivoting and/or rotating. In the case of the latter applications, it is recommended that at least one additional signal transmitter be integrated in the combination control grip, depending on the needed number, type and degrees of freedom of the aforementioned internal load pickup means of the truck.

Figure 5:
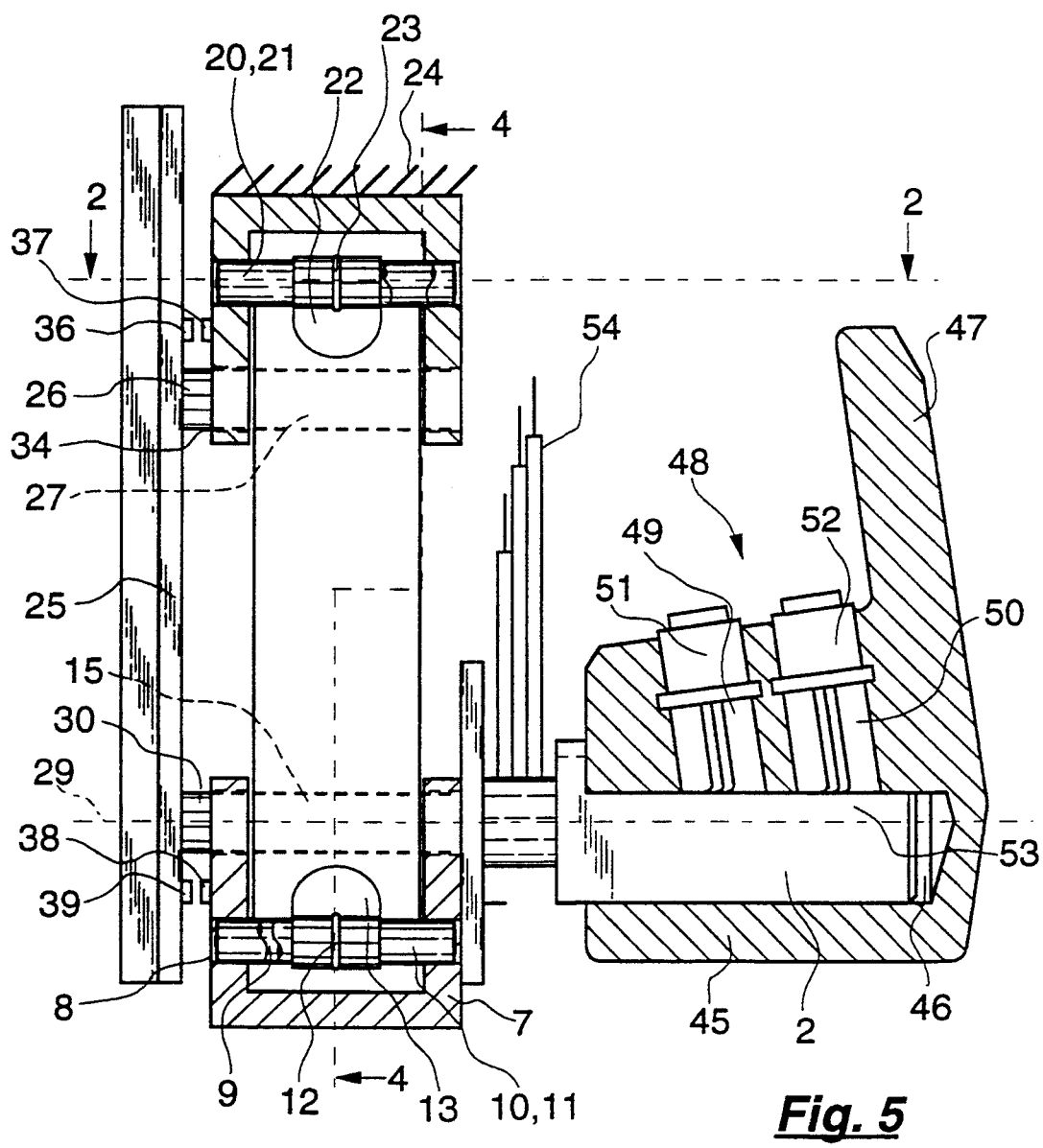
FIG. 5 is a top view of a preferred embodiment of the combination control grip with a partial section of a control lever according to the present invention.

To take into account these requirements, the combination control grip 2 according to FIG. 5 is provided with a control lever 45 for this purpose. This control lever 45 is arranged at the free end of the combination control grip 2 by means of a blind hole 46, and it is preferably bonded thereto for manufacturing reasons and to reduce costs. The control lever 45 is provided with an upwardly extending, grip-like projection 47 acting as a grip element for the operator's hand, which may have finger-shaped recessed grips (not shown) on its outside facing away from the two-hinge rotary switch 1.

The control lever 45 is provided, in front of its the projection 47, with a switching surface 48, which is slightly sloped toward the two-hinge rotary switch 1 and is provided with holes 49 and 50. Signal transmitters 51 and 52, which may be designed as pushbuttons, push switches, rocker-type switches, or the like, are recessed in the holes 49 and 50, preferably in the area of the thumb or forefinger of the gripping hand. The holes 49 and 50 lead to a cable duct 53 recessed in the jacket surface of the combination control grip 2. The holes 49 and 50 as well as well as the cable duct 53 are provided for accommodating control lines 54, which lead to adjusting means, which are prior-art means and are therefore not represented and described in detail, and the cable outlet from the combination control grip 2 is preferably filled with cast plastic.

Figure 6:
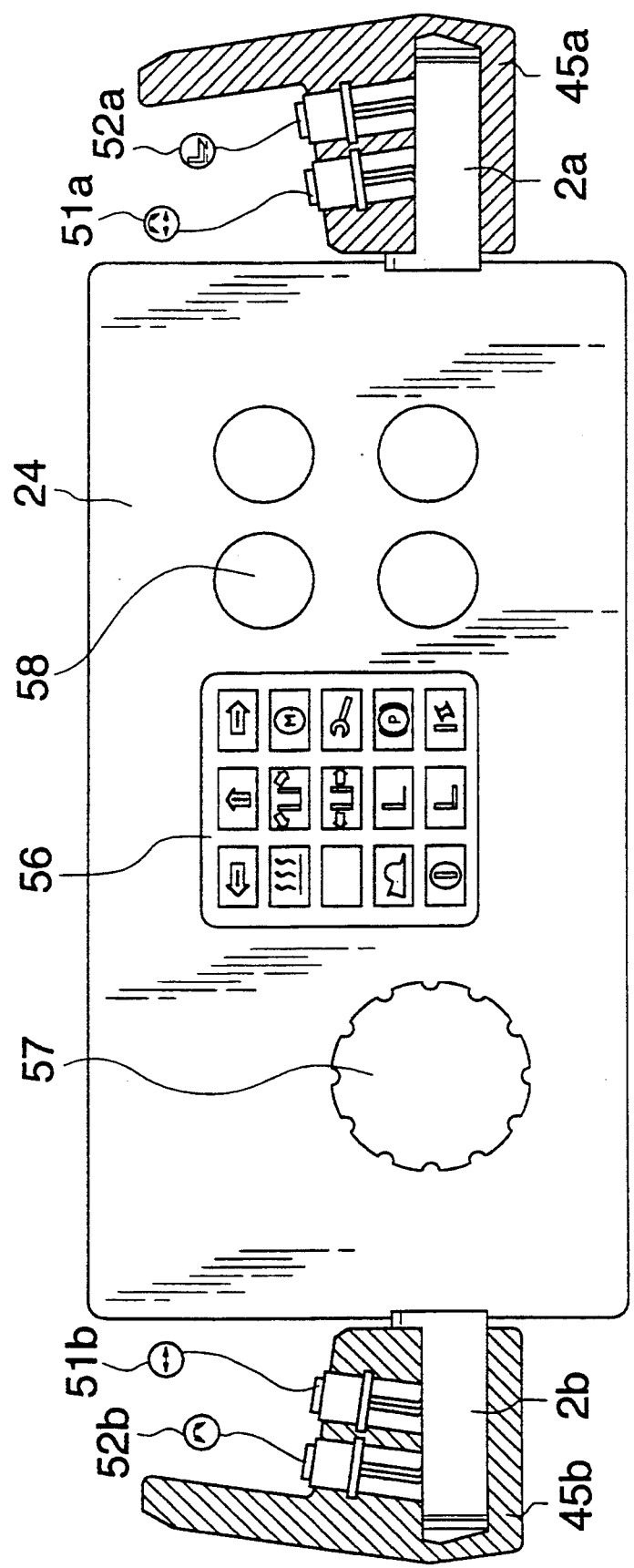
FIG. 6 is a schematic top view of a control panel with combination control grips arranged on the two sides according to the present invention as a schematic diagram.

As an alternative or in addition hereto, additional signal transmitters, which can be operated by the fingers, may be arranged, as needed, next to the signal transmitters 51 and 52 in the switching surface 48 and-/or on the inside of the grip-like projection 47 facing the two-hinge rotary switch 1. The control panel 24 of an industrial truck is usually provided with two the combination control grips 2a and 2b, which are equipped with the control levers 45a and 45b and are preferably attached to the two sides of the control panel 24. FIG. 6 shows a top view of such a the control panel 24, wherein the corresponding two-hinge rotary switch 1 is arranged hidden under the control panel 24.

Besides various function indications 56, the control panel 24 is also provided with a steering element 57 in the form of a steering button or steering wheel, as well as with a selectable number of additional signal elements 58, which can be operated by the fingers, with options for predetermined control functions (FIG. 6).

The following description is based on the assumption that the control panel 24 is arranged on a commissioning truck of prior-art design, which is therefore not represented and described in detail e.g., on a model MX 20 from the firm of Wagner Ferdertechnik GmbH & Co. KG, 7410 Reutlingen Federal Republic of Germany. Such a commissioning truck is equipped with a driver's cab, whose height can be changed by a principal lifting movement, and on which a load pickup means is arranged, which in turn can be adjusted in height in relation to the driver's cab to a limited extent by an initial lifting movement. The load pickup means is designed as a telescoping pivoting retractable fork, which can be displaced in the transverse direction on the front side of the driver's cab by a pushing movement and can be rotated by 180° by a rotary movement. In addition, it is possible simultaneously to rotate and push the pivoting retractable fork by a simultaneous movement, hereinafter called "synchronous rotation."

The signal transmitters 51a and 52a as well as 51b and 52b are used to select and actuate prior-art control circuits or adjusting means for the actually desired type of movement of the load pickup means. The signal transmitters 51a through 52b specifically control the following control commands:

signal transmitter 51a = synchronous rotation (rotation and pushing simultaneously),
signal transmitter 52a = initial lifting movement,
signal transmitter 51b = pushing,
signal transmitter 52b = rotation.

The rotary movement of the combination control grip 2a on the right-hand side is associated, based on the control lever 45a of this combination control grip, and according to the movement arrow 35a, primarily with speed control signals for the travel drive as well as for the synchronous rotation of the load pickup means, while the equivalent rotary movement of the combination control grip 2b on the left-hand side generates, based on the control lever 45b of the latter combination control grip, mainly speed control signals for the principal lifting movement of the driver's cab and for the initial lifting movement of the load pickup means.

While the above-described rotary movements of both the combination control grips 2a and 2b are used only alternatively, i.e., in addition to the forced acknowledgment of the two-hand control command, this is reserved mainly for the vertical deflecting movements of the two combination control grips 2a and 2b. Thus, the principal lifting movement is initiated by a vertical deflecting movement of the right-hand combination control grip 2a by depressing the control lever 45a (control lever 45 of the control grip 2a) of this combination control grip 2a, indicated in FIG. 6 by a so-called "pressure cross" 55a indicating the vertical direction of movement, as it were, as a two-hand control command, and a control signal for the travel drive is derived from the corresponding deflecting movement of the left-hand combination control grip 2b according to the pressure cross 55b.

It is advantageous to connect the signal transmitters 51a through 52b as well as the control levers 45a and 45b such that each signal-generating element on one side of the control panel 24 is used as a forced acknowledgment member for each signal-generating element on the other side of the control panel 24.

The mode of action of the combination control grip member 2 (2a and 2b are structured to be substantially mirror images of each other and operate in a similar manner such that discussion of operation is directed to FIGS. 1–4 wherein the reader will appreciate that the left hand control grip operates in the same way as the right hand grip shown) according to the present invention will be explained in greater detail below.

Figure 3:
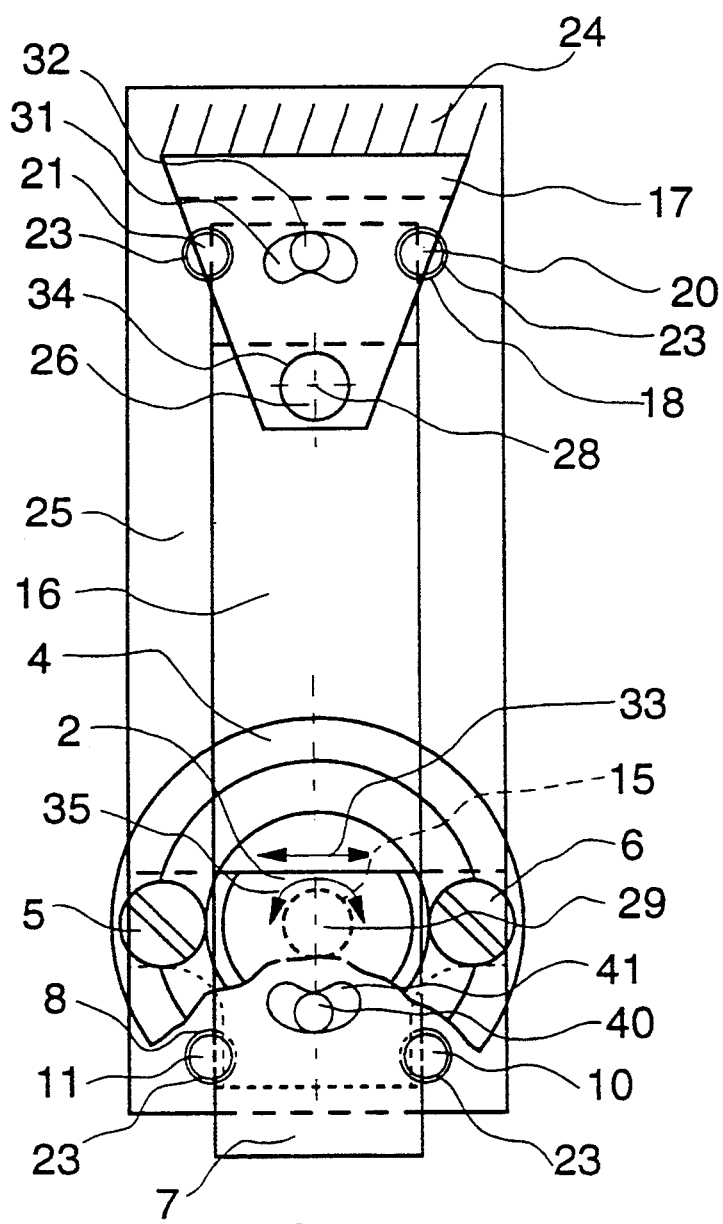
FIG. 3 is a side view of FIG. 1.
Figure 4:
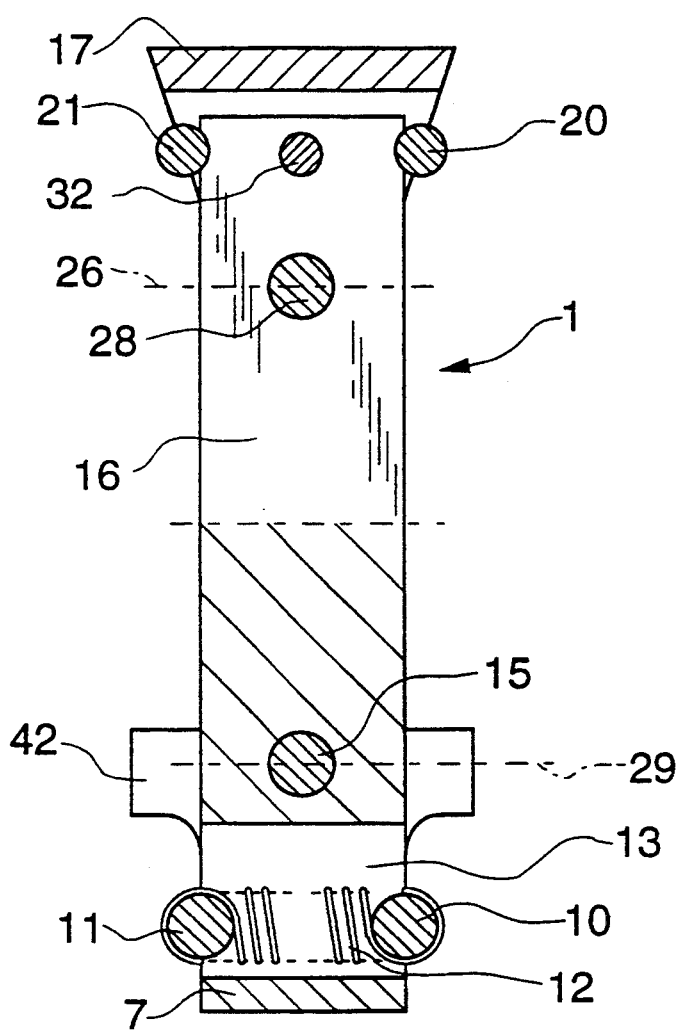
FIG. 4 is a partially cutaway side view along line 4—4 in FIG. 1.

For generating a first control signal one must not push the turning grip in vertical direction, but turn it in right or left circumferencial direction as shown in FIG. 3 with the movement arrow 35. Because the combination control grip member 2 is rigidly fixed by means of the flange 4 to the second articulated shoe 7, the shoe 7 itself will do the same rotational motion caused by turning the combination control grip member 2. Thereby the second component 38 of the second signal-generating means 38, 39 which is preferably a permanent magnet, will be turned, too, in kind of a circumferencial movement against the first component 39 of the second signal-generating 38, 39 means which is preferably a hall-generator. It should be noted that the hinge pin 15 is not fixed at the flange 4 but is pivotally arranged in the through hole 14 of the flange 4. Because of this there isn't any connection between the combination control grip member 2 and the hinge pin 15. For this reason, the hinge pin 15 will remain moveless if the combination control grip member 2 will be turned. Because the sheet bar 25 is fixed at the hinge pin 15, it remains without any movement in its original position, too. Because the first component 39 of the second signal-generating means 38, 39 is rigidly attached at the sheet bar 25, it stands still, too.

By the rotary movement of the combination control grip member 2, which is represented by the movement arrow 35 in FIGS. the front articulated shoe 7 is rotated around the axis of rotation 29 of the hinge pin 15 to the right or left, depending on the direction of rotation. Due to the rigid connection to the coupling member 16, the absolute position of the sheet bar 25 with the second component of the second signal-generating means (preferably a hall-generator) 39 remains unchanged, while the position of the first component of the second signal-generating means (preferably a permanent magnet) 38 arranged at the front articulated shoe 7 in relation to the second component of the second signal-generating means (preferably a hall-generator) 39 will change. The changes in the magnetic field that now occur as a function of the magnitude of the angle of rotation are detected by the first component of the second signal-generating means (preferably a permanent magnet) 38, and adjusting signals for the travel control or lifting control are generated via signal processing means that are known and therefore not described in detail or shown.

Since the articulated shoe 7 is pretensioned against torsion in relation to the coupling member 16 in a spring-loaded manner by the two spring bolts 10 and 11, which are spring-tensioned relative to one another, one of the spring bolts 10 or 11 is forcibly lifted out from the arc-shaped hinge socket 19 of the articulated shoe 7 during the rotation of the articulated shoe 7 by its arc-shaped recesses 8, and carried against the restoring force of the draw spring 12 acting on it in the direction of rotation of the combination control grip member 2. Since the opposite spring bolt 10 or 11 retains its absolute position in the arc-shaped hinge socket 9 of the stationary coupling member 16, the draw spring 12 is tensioned increasingly with increasing angle of rotation of the combination control grip member 2, thereby increasing its restoring force. As soon as the combination control grip member 2 is again released, the opposing force of the restoring spring 12 again pulls the deflected spring bolt 10 or 11 together with the articulated shoe 7 back into its neutral starting position or zero position.

Figure 2:
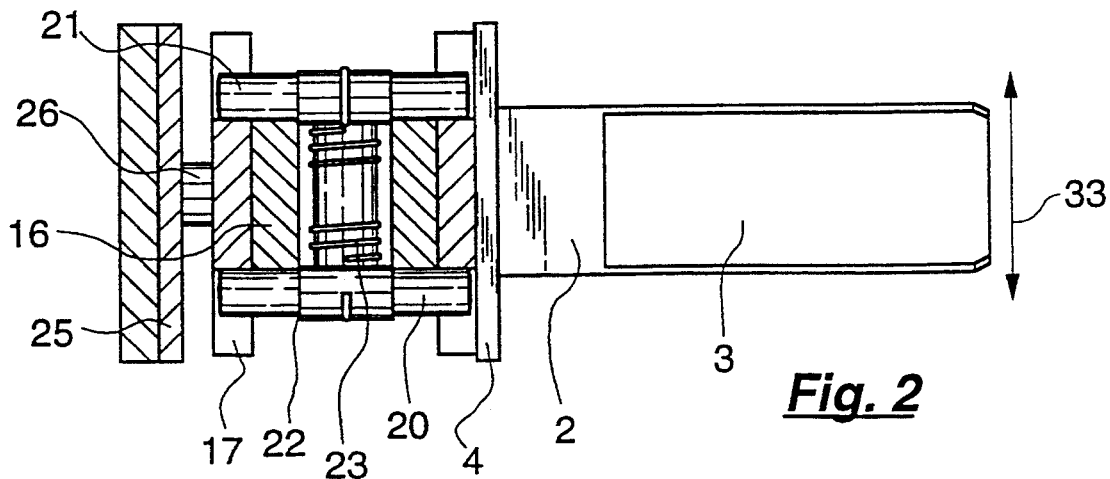
FIG. 2 is a partially cutaway front view along line 2—2 in FIG. 1.

A second degree of freedom is used to provide a second control signal by pressing the turning grip member 2 from top to bottom and vice versa in a swingings direction, as shown in FIG. 2 by the movement arrow 33. Thereby the coupling member 16 (in kind of a tumbler lever or a swing) will be rotated in the stationary fixed articulated shoe 17 around the axis of rotation 28 (FIG. 3) of the hinge pin 27 in kind of a swivelling movement. In this way coupling member 16 will act as a lever around the (lever) axis 28. Thereby the articulated shoe 17, which is stationaryily fixed onto the housing 24, remains absolutely motionless. Because the second component 37 of the first signal-generating means 36, 37 is fixed on the stationary articulated shoe 17 also always remains in its original position without any movement.

Because the hinge pin 27 is fixed into the coupling member 16 in kind of an interference fit (press molding), the sheet bar 25 will make the same swivelling motion as the end of the coupling member 16 in the articulated shoe 17. This results, because the sheet bar 25 is fastened at the hinge pin 25. Because of this reason the first component 36 of the first signal-generating means 36 and 37 will be moved circumferencially in relation to the motionless remaining second component 37 of the first signal-generating means.

During a swinging vertical deflecting movement of the combination control grip member 2 in the upward or downward direction corresponding to the direction of arrow 33, which is indicated in FIG. 2, the freely hanging front end of the coupling member 16 in the stationary articulated shoe 17 is deflected around the axis of rotation 28 of the first hinge pin 27. In principle, this is an exclusive rotary movement of the entire two-hinge rotary switch I around an extended radius. Since the sheet bar 25 is securely connected to the coupling member 16 via the supports 26 and 30 of the first hinge pins 15 and 27, it follows the swingings deflecting movement of the combination control grip member 2 and is lowered or raised at the end of the grip together with it. As a result, the other end of the sheet bar 25 is deflected in the opposite direction together with the coupling member 16 around the axis of rotation 28, as a result of which the position of the first component of the first signal-generating means (preferably a hall-generator) 36 in relation to the second component of the first signal generating means (preferably a permanent magnet) 37, which maintains its absolute position due to being fastened to the stationary articulated shoe 17, will change. As was mentioned above, the change in the magnetic field is now detected, and a signal for the forced acknowledgment of two-hand control will be derived from it.

To limit the rotation of the front articulated shoe 7 in the coupling member 16, as well as the rotation of the coupling member 16 in the stationary articulated shoe 17, one arc-shaped guide groove 41 and 31 each is recessed, according to the representation shown in FIG. 3, at least in one side plate of the two articulated shoes 7 and 17. Both side plates of the articulated shoes 7 and 17 preferably have such guide grooves 41 and 31. Guide pins 40 and 32, which are fastened in the coupling member 16 on an imaginary line in the middle of the spring bolts 10 and 11 or 20 and 21 and are guided in the guide grooves 41 and 31, extends into the guide grooves 41 and 31. Depending on the position of the arc-shaped guides 41 and 31, the amount of the angle of rotation of the front articulated shoe 7 around the axis of rotation 29 in the coupling member 16, as well as the deflection of the coupling member 16 around the axis of rotation 28 in the stationary articulated shoe 17 can be limited, because the guide pins 40 and 32 come into contact with the ends of the guide grooves 41 and 31 in the respective movement end positions.

As a result, the operator has the particular possibility of generating either travel control signals or lifting control signals by the rotary movement of one of the two combination control grips 2a or 2b corresponding to the movement arrow 35 (FIG. 3) while he is able to perform the necessary forced acknowledgment for two-hand control by a simultaneous swinging deflecting movement of the other combination control grip 2—also in mutual interaction with one another—corresponding to the movement arrow 33 (FIG. 3). In addition, the deflecting movement 33 can be superimposed, if necessary, to the rotary movement 35 of the combination control grip 2, and vice versa, in order to thus generate simultaneously travel control signals and lifting control signals for diagonal travel of the industrial truck. This requires a simultaneous rotary and deflecting movement of at least one of the two combination control grips 2a or 2b in order to ensure forced acknowledgment, on the one hand, and to generate one of the two truck control signals (either travel control signal or lifting control signal), on the other hand, while the other combination control grip 2a or 2b needs only be rotated in order to generate the second truck control signal (either lifting control signal or travel control signal).

Two combination control grip members 2 are usually arranged on the control panel 24 of the industrial truck, preferably on two sides of the control panel. These control grip members 2 with double jointed turn switch are as shown in FIG. 1 with the grip preferably extending outward for each assembly (e.g. the left grip extending from right to left). The operator thus has the particular possibility to generate either travel control or lifting control signals by rotary movement of one of the two combination control grip members 2 corresponding to the movement arrow 35 (FIG. 3), while the operator can perform the necessary forced acknowledgment for two-hand control by a simultaneous vertical deflecting movement of the other combination control grip member 2, even in mutual interaction with one another, according to the movement arrow 33 (FIG. 3). In addition, the swinging deflecting movement 33 can be superimposed, if necessary, to the rotary movement 35 of the combination control grip member 2 or vice versa, in order to thus generate travel control and lifting control signals simultaneously for the diagonal travel of the industrial truck. This requires simultaneous rotary and deflecting movement of at least one of the two combination control grip members 2 ( 2a and 2b) in order to perform forced acknowledgment, on the one hand, and to generate one of the two truck control signals (either travel control signal or lifting control signal), on the other hand, while the other combination control grip members 2 (2a and 2b) needs only be rotated in order to generate the second truck control signal (either lifting control signal or travel control signal).

Since the operator is thus able to perform forced acknowledgment and to simultaneously generate at least one vehicle control signal with each hand, reaching over to different signal transmitters, which is troublesome and time-consuming and hinders economically optimal operation of the industrial truck, and also diverts the operator from the actual loading process because of the need to change his line of sight, is eliminated.

As an alternative, to simplify the operation of the combination control grip member 2, the control signal for forced acknowledgment can also be associated with the rotary movement according to the movement arrows 35a and 35b of the combination control grip member 2a and 2b (FIG. 6) to facilitate the steering of the truck, and be derived in parallel and simultaneously from the second signal-generating means 38, 39, e.g., in the form of a threshold value generation.

The commissioning truck is usually driven by the operator manually in broad storage aisles or in aisles between shelves, e.g., during the transfer from one aisle between shelves to another. The steering movements are now generated by the operator's left hand on the basis of the steering element 57, while the speed of travel is controlled by the deflection of the combination control grip 2a by the operator's right hand according to the movement arrow 35 (FIG. 3) so that both hands are forcibly associated with the controls, and the operator is prevented from reaching out of the lateral contours of the truck.

However, the commissioning truck is surface-guided, usually rail-borne, within the aisles between shelves, as a result of which the need for steering movements is eliminated, and the operator's left hand becomes free. Based on this, it would be, in principle, possible for the operator to reach into the shelves beyond the external contours of the truck during travel between shelves and cause accidents. However, the accident prevention regulations and safety rules mandatorily specify two-hand operation to prevent this.

As was described above, the actually desired type of movement of the load pickup means is selected with one of the signal transmitters 51a through 52b and is preset as a set value of the respective opposite combination control grip 2a or 2b, with which forced acknowledgment of the speed of the selected movement is then controlled and forced-acknowledged at the same time.

For example, the type of movement "simultaneous rotation" of the load pickup means is preselected with the right-hand signal transmitter 51a, and its speed is controlled by a rotary movement of the opposite combination control grip 2b on the basis of its the control lever 45b around the movement arrow 35 (FIG. 3). The combination control grip 2b and the control lever 45b are used as a mutual forced acknowledgment member.

To initiate the initial lifting movement of the load pickup means at the driver's cab, it is necessary to actuate the signal transmitter 52a associated with this type of movement, and both the speed control and the forced acknowledgment of the two-hand control command are performed—as was described above—by rotating the opposite combination control grip 2b.

The types of movement "pushing" or "rotation" of the load pickup means are preselected in an equivalent manner by depressing the left-hand signal transmitters 51b and 52b, and the actual speeds of movement are then controlled while ensuring two-hand operation at the same time by a rotary movement of the right-hand combination control grip 2a according to the movement arrow 35a.

During the initiation of a travel movement within the aisle between shelves, in which case the need for steering movements of the commissioning truck is eliminated because it is rail-bound, it should be made sure, in particular, that both hands of the truck driver must be continuously bound to control members in order to rule out the possibility of reaching out into the shelves during the travel of the truck with absolute certainty. Therefore, this requires first a deflection of the left-hand combination control grip 2b in the vertical direction corresponding to the pressure cross 55b in order to control the travel drive. However, in order for the commissioning truck to be able to move, it is additionally necessary to give a forced acknowledgment of this control signal by the right-hand combination control grip 2a, whose deflecting movement on the basis of its the control lever 45a in the direction of the movement arrow 35a must at the same time generate a proportional speed signal for the travel drive. The travel drive is switched on only when the control has recognized that both hands of the truck driver touch control elements.

The principal lifting movement for the driver's cab along with the load pickup means is operated in a reciprocal manner. The adjusting means for the principal lifting movement are actuated on the basis of a vertical deflecting movement of the right-hand combination control grip 2a according to the pressure cross 55a, and the speed of the lifting movement is controlled proportionally by rotating the left-hand combination control grip 2b by means of its the control lever 45b.

The present invention is not, of course, limited in any way to the embodiment represented in the figures and described in the specification. It is apparent that numerous design and functional modifications and enhancements, e.g., the use of any commercially available digital or analog signal-generating means, which can be used for the intended purpose of inducing travel control and/or lifting control signals, as well as the selection of other spring means for the automatic resetting of the two-hinge rotary switch 1, or the arrangement of locking positions for maintaining defined and preselectable rotary and deflection angles of the combination control grip member 2 in order to generate specific travel control and/or lifting control signals, are also within the scope of the present invention.

The present invention also alternatively includes, as needed, the association of defined signal transmitters with other or additional control signals, which may depend, among other things, on the design and the number of load manipulation units or the like.

The limits of the present invention can, of course, also be set so wide that the arrangement of at least one additional digital or analog signal transmitter on the combination control grip member 2 for controlling another degree of freedom of a load platform of the industrial truck, e.g., for pivoting or turning the load platform around a third axis, is also conceivable. Such a signal transmitter may also be designed according to the device described in German Offenlegungsschrift No. 39,25,872, or it may be arranged on the front side of the combination control grip member 2 as a pressure or rocker-type switch. It is apparent to the average person skilled in the art without being specially mentioned that analog signals can be derived from the relative movement of the first and second signal-generating means 36 and 37 as well as 38 and 39 in relation to one another, in addition to the digital signals, e.g., for generating threshold values.

While a specific embodiment of the invention has been shown and described in detail to illustrate the application of the principles of the invention, it will be understood that the invention may be embodied otherwise without departing from such principles.

What is claimed is:

1. A combination control grip for two-handed operation of guided-surface industrial trucks, particularly for aisle forklifts, comprising: a two-hinge rotary switch including a first jointed end rigidly attached to a housing and an opposite freely hanging second jointed end; a combination control grip member connected to said freely hanging end of said two-hinge rotary switch, said combination control grip member being mounted for movement of said two-hinge rotary switch for a first motion type wherein said two-hinge rotary switch is moved about said first jointed end and a second motion type, wherein said two-hinge rotary switch moves relative to said second jointed end, said first motion type and said second motion type being superimposable said combination control grip member being connected to spring means for pretensioning said combination control grip member against torsion; first signal-generating means connected to said two-hinge rotary switch for generating a control signal upon detecting said first motion type; and second signal-generation means, connected to said two-hinge rotary switch, for generating a control signal upon detecting said second motion type.

2. Combination control grip in accordance with claim 1, wherein two combination control grip members (2) are simultaneously arranged on a control panel of said housing (24), preferably on both sides of the panel, one of said combination control grip members (2) for generating a travel control signal and the other for generating a lifting control signal are provided, and that each combination control grip member (2) is provided simultaneously as a mutual (reciprocal) forced acknowledgment member for the other, providing acknowledgement of a two hand control signal, whereby the combination control grip members force an operator to keep both hands on the combination control grip members for an accident prevention.

3. A combination control grip according to claim 1, wherein one of said first signal-generating means and said second signal-generating means includes a contactless digital signal generating means in the form of a Hall generator operating according to a magnetostrictive principle.

4. A combination control grip according to claim 1, wherein one of said first signal-generating means and said second signal-generating means includes a contactless analog signal generator formed of a rotary potentiometer.

5. A combination control grip according to claim 1, wherein one of said first signal-generating means and said second signal-generating means comprises a forked photocell.

6. A combination control grip according to claim 1, wherein said two-hinge rotary switch comprises a coupling member mounted by hinges to two articulated shoes, said shoes forming said first and second jointed ends, said shoes including a free end articulated shoe and a fixed end articulated shoes rigidly attached to said housing, said coupling member including terminal hinge sockets supporting opposite and mutually spring-tensioned spring bolts, said articulated shoes including recesses for automatically resetting said two-hinge rotary switch as said spring-tension spring bolts are urged into said recesses, after torsion is applied to said two-hinge rotary switch.

7. A combination control grip according to claim 6, wherein an electronic board is fastened to said coupling member, said first signal-generating means including a first signal generating element supported by said free end articulated shoe and a second signal-generating element supported by said electronic board, said second signal-generating means including a third signal-generating element connected to said fixed articulated shoe and a forth signal-generating element connected to said electronic board, said control grip member being attached to said free end articulated shoe on a side facing away from said electronic board.

8. A combination control grip according to claim 7 wherein said coupling member and said electronic board and said forth signal-generating element can be moved by a vertical deflecting movement of said control grip member, around an axis of rotation in relation to said fixed articulated shoe for movement of said forth signal-generating element relative to said third signal-generating element, said free end articulated shoe with said first signal-generating element can be moved by rotating said control grip members around an axis of rotation of said control grip members, in relation to said electronic board for movement of said first signal-generating element relative to said second signal-generating element.

9. A combination control grip according to claim 6, wherein arc-shaped guide grooves for limiting a rotary movement of said combination control grip member, in functional connection with guide pins, arranged in said coupling member, are provided at least on one side plate of each of said articulated shoes. said stationary fixed joint as well as about said free-hanging joint motion in said vertical direction and in said circumferential direction of the combination control grip member being superimposable; said two-hinge rotary switch containing first and second signal-generating means for detecting turn amplitude of swivelling; a first signal generating means and a second signal-generating means provided for generating vehicle control signals based on movement in said vertical direction and in said circumferential direction whereby the combination control grip may be used to force the operator to keep both hands on said combination control grip member according to the accident prevention regulations.

10. Combination control grip in accordance with claim 1, further comprising: at least one additional signal transmitter (51 or 52), operated by said additional signal transmitter being arranged at the combination control grip (2) for generating at least one additional control signal being generated thereby depending on the needed number, type and degrees of freedom of internal load pickup means of the truck.

11. Combination control grip in accordance with claim 10, wherein two said additional signal transmitters (51, 52) are arranged in the circumferential jacket surface and/or the free front surface of the combination control grip (2).

12. Combination control grip in accordance with claim 10 wherein said additional signal transmitter (51, 52) is integrated in a control lever (45) arranged on the combination control grip (2).

13. Combination control grip in accordance with claim 10, wherein said signal transmitter (51, 52) is designed as a one of a push switch and rocker-type switch, said additional signal transmitter having a control line (54) positioned in a cable duct (53) recessed in the combination control grip (2).

14. Combination control grip in accordance with claim 10, wherein said additional signal transmitter (51a, 52a and 51b, 52b) is provided for selecting the actual type of movement of at least one load pickup means as well as for presetting a set value and/or forced acknowledgment of the two-hand control commands for a respective opposite combination control grip (2a or 2b).

15. Combination control grip in accordance with claim 12, wherein said control lever (45a, 45b) is provided for generating proportional speed signals for both the movements of the load pickup means and the travel drive and/or for the forced acknowledgment of two-hand control commands.

16. Combination control grip in accordance with claim 12, wherein said control lever (45a, 45b) is rotatable around the longitudinal axis of the combination control grip (2a, 2b) for generating proportional speed signals and can be deflected in the vertical direction in relation to the longitudinal axis of the combination control grips (2a, 2b) for the forced acknowledgment of the two-hand control commands.

17. Combination control grip in accordance with claim 16, wherein said signal transmitter (51a, 52a and 51b, 52b), as well as the rotary and deflecting movements of the control lever (45a, 45b) can be alternatively associated with other control signals.

18. A combination control grip for two-handed operation of guided-surface industrial trucks, particularly for aisle forklifts, comprising: a two-hinge rotary switch containing two joints, one of said joints being stationary fixed and the other joint being freely hanging; said freely hanging joint connected with a combination control grip member; said combination control grip member being moveable in vertical direction as well as turnable in a circumferential direction causing horizontal swivelling of said two-hinge rotary switch about said stationary fixed joint as well as about said free-hanging joint motion in said vertical direction and in said circumferential direction of the combination control grip member being superimposable; said two-hinge rotary switch containing first and second signal-generating means for detecting turn amplitude of swivelling; a first signal generating means and a second signal-generating means provided for generating vehicle control signals based on movement in said vertical direction and in said circumferential direction whereby the combination control grip may be used to force the operator to keep both hands on said combination control grip member according to the accident prevention regulations.

* * * * *